US012038966B2

(12) United States Patent
Stauder et al.

(10) Patent No.: US 12,038,966 B2
(45) Date of Patent: *Jul. 16, 2024

(54) METHOD AND APPARATUS FOR DATA RETRIEVAL IN A LIGHTFIELD DATABASE

(71) Applicant: INTERDIGITAL CE PATENT HOLDINGS, Paris (FR)

(72) Inventors: Jurgen Stauder, Montreuil-sur-Ille (FR); Neus Sabater, Betton (FR); Cedric Thebault, Chantepie (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 500 days.

This patent is subject to a terminal disclaimer.

(21) Appl. No.: 16/934,636

(22) Filed: Jul. 21, 2020

(65) Prior Publication Data
US 2020/0349187 A1 Nov. 5, 2020

Related U.S. Application Data

(63) Continuation of application No. 15/183,213, filed on Jun. 15, 2016, now Pat. No. 10,726,067.

(30) Foreign Application Priority Data

Jun. 17, 2015 (EP) .................................. 15305941

(51) Int. Cl.
G06F 16/51 (2019.01)
G06F 16/583 (2019.01)
G06F 18/22 (2023.01)
G06T 7/60 (2017.01)

(52) U.S. Cl.
CPC ............ *G06F 16/51* (2019.01); *G06F 16/583* (2019.01); *G06F 16/5854* (2019.01); *G06F 18/22* (2023.01); *G06T 7/60* (2013.01); *G06T 2207/10052* (2013.01)

(58) Field of Classification Search
None
See application file for complete search history.

(56) References Cited

U.S. PATENT DOCUMENTS 8,416,240 B1  4/2013  Kuffner, Jr. et al.
2014/0092281 A1  4/2014  Nisenzon et al.
2014/0341475 A1*  11/2014  Shen .................... G06F 16/583
                                                         382/218

OTHER PUBLICATIONS

Belhallouche et al., "Light Field Retrieval In Compressed Domain", WSCG 2013 Conference on Computer Graphics, Visualization and Computer Vision, Plzen, Czech Republic, Jun. 24, 2013, pp. 1-4.

(Continued)

*Primary Examiner* — Tuankhanh D Phan
(74) *Attorney, Agent, or Firm* — Tutunjian & Bitetto, P.C.

(57) ABSTRACT

A method and an apparatus for data retrieval in a lightfield database are described. An acquiring unit of the apparatus acquires a sample data. An operation unit determines a plurality of two-dimensional (2D) images from each 4D lightfield data of the lightfield database, and match the sample data with the determined 2D images according to geometrical parameters of the sample data and geometrical parameters of the 2D images. One of the 2D images is selected as a target image based on the matching result, and the 4D lightfield from which the target image is determined is retrieved.

20 Claims, 3 Drawing Sheets

(56) References Cited

OTHER PUBLICATIONS

Shen et al., "3D Model Search Engine Based on Lightfield Descriptors", Eurographics 2003, Grenada, Spain, Sep. 1, 2003, pp. 1-7.
Dickinson et al., "Viewpoint-Invariant Indexing for Content-Based Image Retrieval", 1998 IEEE International Workshop on Content-Based Access of Image and Video Database, Bombay, India, Jan. 3, 2003, pp. 20-30.
Klein et al., "A Single-Frame Visual Gyroscope", British Machine Vision Conference (BMVC'05), Oxford, England, Sep. 5, 2005, pp. 1-10.
MacLachlan et al., "Tracking of Moving Objects from a Moving Vehicle Using a Scanning Laser Rangefinder", 2006 IEEE Intelligent Transportation Systems Conference, Toronto, Ontario, Canada, Sep. 17, 2006, pp. 301-306.
Maeno et al., "Light Field Distortion Feature for Transparent Object Recognition", 2013 IEEE Conference on Computer Vision and Pattern Recognition, Portland, Oregon, USA, Jun. 23, 2013, pp. 2786-2793.
Ng et al., "Light Field Photography with a Hand-Held Plenoptic Camera", Stanford University Computer Science Department, Stanford Tech Report CTSR Feb. 2005, Apr. 2005, pp. 1-11.
Van De Sande et al., "Evaluating Color Descriptors for Object and Scene Recognition", IEEE Transactions on Pattern Analysis and Machine Intelligence, vol. 32, No. 9, Sep. 2010, pp. 1582-1596.
Chen et al., "On Visual Similarity Based 3D Model Retrieval", Computer Graphics Forum, vol. 22, No. 3, Sep. 1, 2003, pp. 223-232.
Yang et al., "3D Model Retrieval Based on Exact Visual Similarity", 9th IEEE International Conference on Signal Processing (ICSP 2008), Beijing, China, Oct. 26, 2008, pp. 1556-1560.
List of Patents or Patent Applications Treated as Related dated Jul. 21, 2020, 8 pages.

\* cited by examiner

METHOD AND APPARATUS FOR DATA RETRIEVAL IN A LIGHTFIELD DATABASE

CROSS REFERENCE TO RELATED APPLICATIONS

This application is a Continuation of U.S. patent application Ser. No. 15/183,213 filed on Jun. 15, 2016, which application claims the benefit under 35 U.S.C. 119 of European Patent Application No. 15305941.5 filed on Jun. 17, 2015 and granted as EP No. 3107007 on May 20, 2020.

TECHNICAL FIELD

A method and an apparatus for data retrieval in a lightfield database are proposed. In addition, a computer readable medium suitable for such a method and an apparatus is also proposed.

BACKGROUND

Search and retrieval of two-dimensional (2D) images in a database of 2D images using a sample image and based on similarity between the images is well known in the field. The similarity can be optionally based on different aspects. For example, a sample object shown in the sample image is searched in the database, and the images showing objects similar to the sample object are retrieved as search result. Retrieval methods usually calculate features for the images in the database and compare these features with a sample image or sample data to find similar images. The features can include, for example, color histograms, edges and feature points. The performance of the search generally depends on the quality and robustness of the feature analysis.

There are existing issues and problems for calculation of robust features. First, it is difficult to calculate and extract reliable features, such as edges or feature points, from blurred images. For images including transparent or partially transparent object, color histograms, edge detection and feature point detection would suffer from the background that is visible behind the transparent or semi-transparent object. Scattered objects such as a tree with branched and leaves would expose a large and spatially scattered range of depth. Moreover, for objects seen from different viewpoints among multiple images, geometrical and photometric distortions would make the image retrieval difficult.

Four-dimensional (4D) lightfield of a scene has been introduced as an alternative choice for image capture. A 4D lightfield can be captured, for example, by a plenoptic camera or a grid of cameras and allows refocusing of the capture after the snapshot, estimating the depth of the scene in the capture and many other flexible editing options for the capture data. Multiple classical 2D images can be calculated from a 4D lightfield data for a same scene. The calculated 2D images, so called lightfield images, may differ in viewpoint, viewing direction, resolution, depth of view, focal plane, etc. For example, a method of calculating refocused 2D images from a lightfield is illustrated in [I], where sub-images from the raw image of the camera sensor are spatially shifted in the image plane and subsequently summarized.

It can be expected that more lightfield data will be available and used in the near future. The techniques and solutions for search and retrieval of the lightfield data will also become essential for users.

SUMMARY

Therefore, it is an objective to propose solutions for data retrieval in a lightfield database including 4D lightfield data. In particular, the solutions are used to search lightfield data in the database that is similar to a given sample data.

According to one embodiment, a method of data retrieval in a lightfield database is proposed. The lightfield database includes 4D lightfield data. The method comprises: acquiring a sample data; determining a plurality of two-dimensional (2D) images from each 4D lightfield data of the lightfield database, each 2D image being different from another 2D image in at least one geometrical parameter; matching the sample data with the determined 2D images according to geometrical parameters of the sample data and geometrical parameters of the 2D images; selecting one of the 2D images as a target image based on the matching result; and retrieving the 4D lightfield data from which the target image is determined. The geometrical parameters comprise at least one of resolution, viewpoint, viewing direction, focal plane, disparity of the sample data and the 2D images, and image object captured in the sample data and the 2D images. The sample data can be optionally a 2D image sample or a lightfield data sample.

Preferably, the 2D images determined from the lightfield database comprise at least one of sub aperture views, refocused images, all-in-focus images, cropped images, inpainted images, denoised images and synthesized images using modified viewpoint, modified disparity or modified depth map of the lightfield database.

Preferably, matching the sample data with the determined 2D images comprises using a geometrical link among multiple 2D images determined from a same lightfield data of the lightfield database. The geometrical link represents a relationship among the geometrical parameters of the multiple 2D images.

In one embodiment, the sample data is a lightfield data sample. The method further comprises: determining a plurality of 2D image samples from the lightfield data sample, each 2D image sample being different from another 2D image sample in at least one geometrical parameter; and matching the 2D image samples of the sample data with the determined 2D images of the lightfield database according to geometrical parameters of the 2D image samples and geometrical parameters of the determined 2D images of the lightfield database.

Preferably, this embodiment of the method further comprises: selecting, from the plurality of 2D image samples, a 2D image sample with a highest sharpness or a 2D image sample where a targeted sample object is shown in a front view as a representative sample of the lightfield data sample; and matching the representative sample with the determined 2D images of the lightfield database according to geometrical parameters of the representative sample and geometrical parameters of the determined 2D images of the lightfield database.

According to one embodiment, an apparatus configured to retrieve data from a lightfield database is introduced. The apparatus comprises an acquiring unit and an operation unit. The acquiring unit is configured to acquire a sample data. The operation unit is configured to determine a plurality of two-dimensional (2D) images from each 4D lightfield data of the lightfield database, each 2D image being different from another 2D image in at least one geometrical parameter; match the sample data with the determined 2D images according to geometrical parameters of the sample data and geometrical parameters of the 2D images; select one of the 2D images as a target image based on the matching result; and retrieve the 4D lightfield data from which the target image is determined. The geometrical parameters comprising at least one of resolution, viewpoint, viewing direction, focal plane, disparity of the sample data and the 2D images, and image object captured in the sample data and the 2D images.

Preferably, the operation unit is further configured to use a geometrical link among multiple 2D images determined from a same lightfield data of the lightfield database. The geometrical link represents a relationship among the geometrical parameters of the multiple 2D images.

In one embodiment, the sample data is a lightfield data sample. The operation unit is further configured to determine a plurality of 2D image samples from the lightfield data sample, each 2D image sample being different from another 2D image sample in at least one geometrical parameter; and match the 2D image samples of the sample data with the determined 2D images of the lightfield database according to geometrical parameters of the 2D image samples and geometrical parameters of the determined 2D images of the lightfield database. Preferably, the operation unit is further configured to select, from the plurality of 2D image samples, a 2D image sample with a highest sharpness or a 2D image sample where a targeted sample object is shown in a front view as a representative sample of the lightfield data sample; and match the representative sample with the determined 2D images of the lightfield database according to geometrical parameters of the representative sample and the determined 2D images of the lightfield database.

Also, a computer readable storage medium has stored therein instructions for data retrieval in a lightfield database, which, when executed by a computer, cause the computer to: acquire a sample data; determine a plurality of two-dimensional (2D) images from each 4D lightfield data of the lightfield database, each 2D image being different from another 2D image in at least one geometrical parameter; match the sample data with the determined 2D images according to geometrical parameters of the sample data and geometrical parameters of the 2D images; select one of the 2D images as a target image based on the matching result; and retrieve the 4D lightfield data from which the target image is determined. The geometrical parameters comprising at least one of resolution, viewpoint, viewing direction, focal plane, disparity of the sample data and the 2D images, and image object captured in the sample data and the 2D images.

The computer readable storage medium can be a non-transitory volatile or non-volatile storage medium, such as, for example, a hard disk, an optical or magnetic disk or tape, a solid state memory device, etc. The storage medium thus tangibly embodies a program of instructions executable by a computer or a processing device to perform program steps as described herein.

The proposed method exploits the insight that a lightfield database contains rich information about the captured scenes. Several drawbacks of conventional image database can be overcome with the use of a lightfield database and the visual information it provides. For example, targeted objects in different depths can be searched retrieved, as well as partially transparent objects and partially scattered objects. In addition, objects seen by different viewpoints can also be searched in the lightfield database. The search and retrieval can be even improved and more efficient when a geometric link is used.

BRIEF DESCRIPTION OF THE DRAWINGS

For a better understanding the proposed solutions shall now be explained in more detail in the following description with reference to the figures. It is understood that the solutions are not limited to the disclosed exemplary embodiments and that specified features can also expediently be combined and/or modified without departing from the scope of the proposed solutions as defined in the appended claims.

DETAILED DESCRIPTION OF PREFERRED EMBODIMENTS

The term "lightfield" used in description should be understood as generally defined in the field. That is, 4D video data comprises, at any instant, angular and spatial information about all the light rays at every point travelling in every direction in a space scene, and can be captured by, for example, a plenoptic video camera, a video camera array, or any other feasible camera device. In particular, a lightfield in the description can be understood as the totality or as a subset of the totality of data captured for a scene that allows generation of 2D image data of the lightfield.

Figure 1:
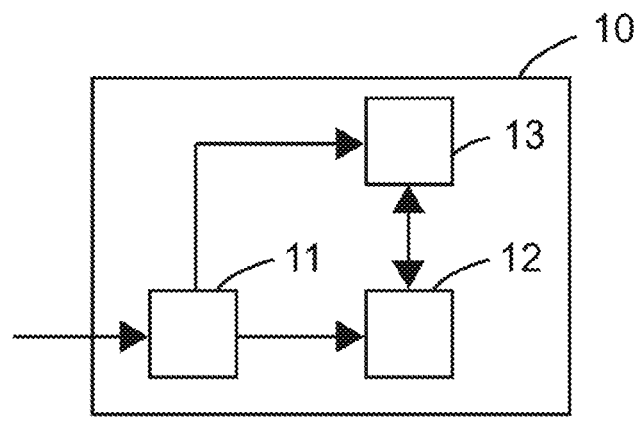
FIG. 1 is a schematic diagram illustrating an exemplary embodiment of an apparatus configured to retrieve data in a lightfield database.

FIG. 1 schematically illustrates an exemplary embodiment of an apparatus 10 configured to retrieve data from a lightfield database including 4D lightfield data. The apparatus comprises an acquiring unit 11, an operation unit 12 and an optional storage unit 13.

The acquiring unit 11 is configured to acquire a sample data. The sample data can be acquired from a user through a user input (not shown) of the apparatus 10 or an external input device. In alternative, the sample data can be retrieved and acquired from an available database, which can, for example, be stored in the storage unit 13.

The storage unit 13 can be any feasible and suitable memory device and can be either integrated in or supplementary to the apparatus 10. The lightfield database, where the 4D lightfield data is retrieved, can also be optionally stored in the storage unit 13.

The operation unit 12 is configured to determine a plurality of 2D images from each 4D lightfield data of the lightfield database. Each of the determined 2D images is different from another 2D image in at least one geometrical parameter. The operation unit 12 is further configured to match the acquired sample data with the determined 2D images according to geometrical parameters of the sample data and the determined 2D images, to select one of the 2D images as a target image based on the matching result, and to retrieve the specific 4D lightfield data from which the target image is determined.

In one embodiment, the operation unit 12 is further configured to use a geometrical link among multiple 2D images determined from a same lightfield data of the lightfield database. The geometrical link represents a relationship among the geometrical parameters of the multiple 2D images.

More details about the operation of the apparatus 10 will be described below together with the proposed method of data retrieval in a lightfield database. Of course, the apparatus 10 can optionally comprise any other additional or alternative devices for the implementation of the embodiments of the proposed method.

Figure 2:
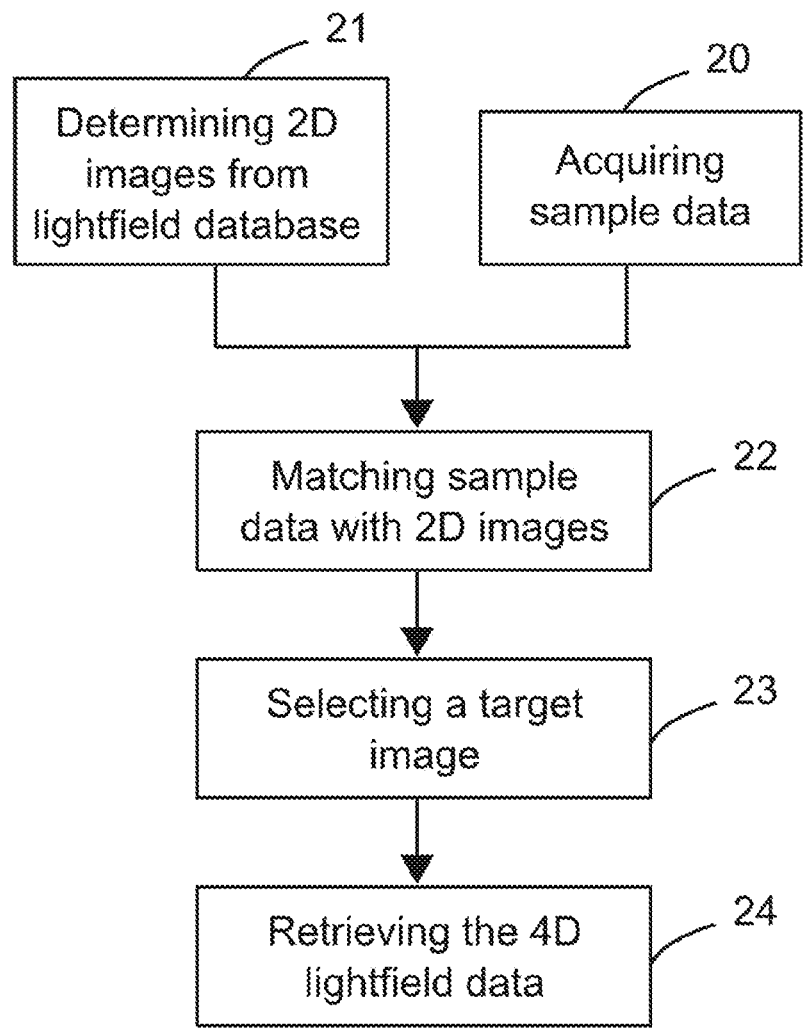
FIG. 2 is a flow chart illustrating a preferred embodiment of a method for data retrieval in a lightfield database.

FIG. 2 schematically illustrates a preferred embodiment of the method for data retrieval in a lightfield database including 4D lightfield data. Referring to FIG. 1, the embodiment of the method will be explained in detail below using the exemplary embodiment of the apparatus 10. It should be understood that the method can be implemented in any other suitable systems or apparatuses known and available in the field.

As described above, a lightfield database is preferably stored in the storage unit 13 of the apparatus 10. In alternative, the lightfield database can also be stored in an external memory device which the apparatus 10 can get access to and retrieve lightfield data from. The lightfield database comprises 4D lightfield data.

The operation unit 12 of the apparatus 10 determines 21 a plurality of 2D images from each 4D lightfield data of the lightfield database. Each of the 2D images is different from one another 2D images in at least one geometrical parameter. Preferably, the geometrical parameters comprise at least one of resolution, viewpoint, viewing direction, focal plane, disparity of the sample data and the 2D images, and image object captured in the sample data and the 2D images. Optionally, the determined 2D images can also be stored in the storage unit 13.

The acquiring unit 11 of the apparatus 10 acquires 20 a sample data. The sample data in principle defines a search or retrieval query and can be optionally a 2D image, a 3D image, a lightfield data, etc. In addition, it is preferred that there is at least one sample object shown and captured in the sample data.

The operation unit 12 then matches 22 the sample data with the determined 2D images according to geometrical parameters of the sample data and the 2D images. Based on the matching result, the operation unit 12 selects 23 one of the 2D images as a target image, and accordingly retrieves 24 the 4D lightfield data from which the target image is determined as a retrieval result.

The proposed method exploits the insight that a lightfield database contains rich information about the scenes captured by these lightfields. It is therefore advantageous and preferable to compare and match the sample data to a maximum of different visual information contained in the lightfield database in order to correctly and precisely evaluate the similarity between the sample data and the lightfield information, and thus reaches an improved retrieval result.

The nature of the 2D images determined 21 from each lightfield data of the lightfield database can be various. For example, the 2D images can be sub aperture views, each of which characterizes in a specific viewing direction. The 2D images can be refocused images or all-in-focus images where all image content is focused. Other types of images can also be determined and calculated from the lightfield data, such as cropped images, inpainted images, denoised images, depth maps, disparity maps or any other type of the images.

Preferably, the 2D images determined 21 from the lightfield data of the lightfield database comprise at least one of sub aperture views, refocused images, all-in-focus images, cropped images, inpainted images, denoised images and synthesized images using modified viewpoint, modified disparity or modified depth map of the lightfield database.

Figure 3:
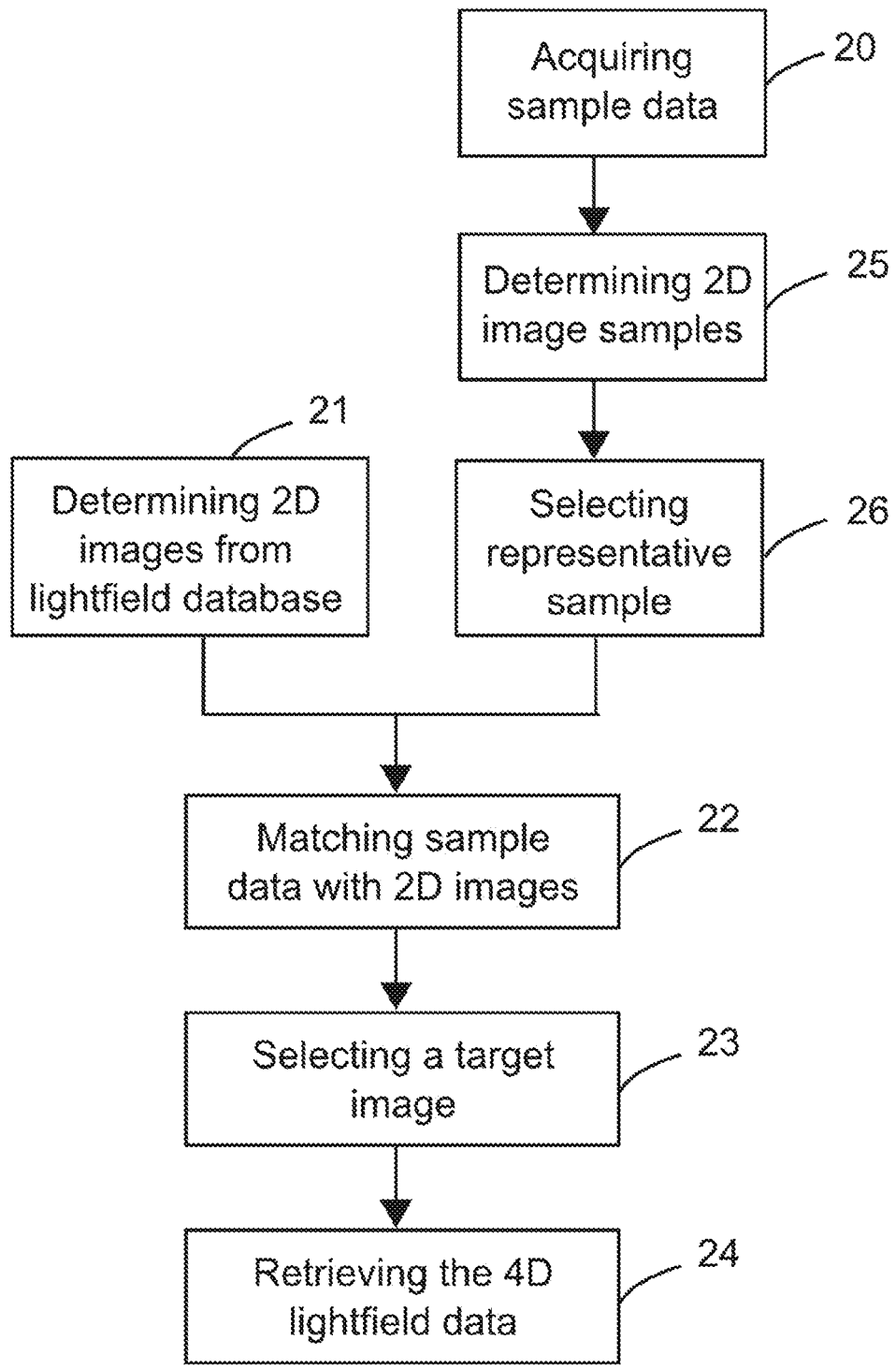
FIG. 3 is a flow chart illustrating another preferred embodiment of a method for data retrieval in a lightfield database.

Referring to FIG. 3, in one embodiment, the acquired 20 sample data is by itself a lightfield data sample. The method thus further comprises determining 25 a plurality of 2D image samples from the lightfield data sample, where each of the 2D image samples is different from one another 2D image sample in at least one geometrical parameter. This can be preferably performed by the operation unit 12 of the apparatus 10. Accordingly, the operation unit 12 matches 22 the 2D image samples of the sample data with the determined 2D images of the lightfield database according to geometrical parameters of the 2D image samples and the determined 2D images of the lightfield database.

Preferably, the method further comprises selecting 26 a representative 2D image sample from the plurality of 2D image samples determined from the given lightfield data sample, which is similarly preferred to be performed by the operation unit 12. This selection is based on the idea that retrieval of images or of objects shown in the images in a database generally works best with the images. The objects or at least part of the objects are clearly shown in images and can be optimally recognized, e.g., with a high sharpness or are viewed from a preferred viewpoint. Thus, it is preferred that the selected representative 2D image sample is the 2D image sample with a highest sharpness and/or the 2D image sample where a targeted sample object is shown in a front view or is sharpest or is best represented. For example, when a person's face is shown in a front view and is with a high sharpness in one of the 2D image samples, this 2D image sample is thus a good candidate to be the representative 2D image sample for the corresponding lightfield data. Accordingly, the operation unit 12 matches 22 the representative sample with the determined 2D images of the lightfield database for the data retrieval in the lightfield database.

Figure 4:
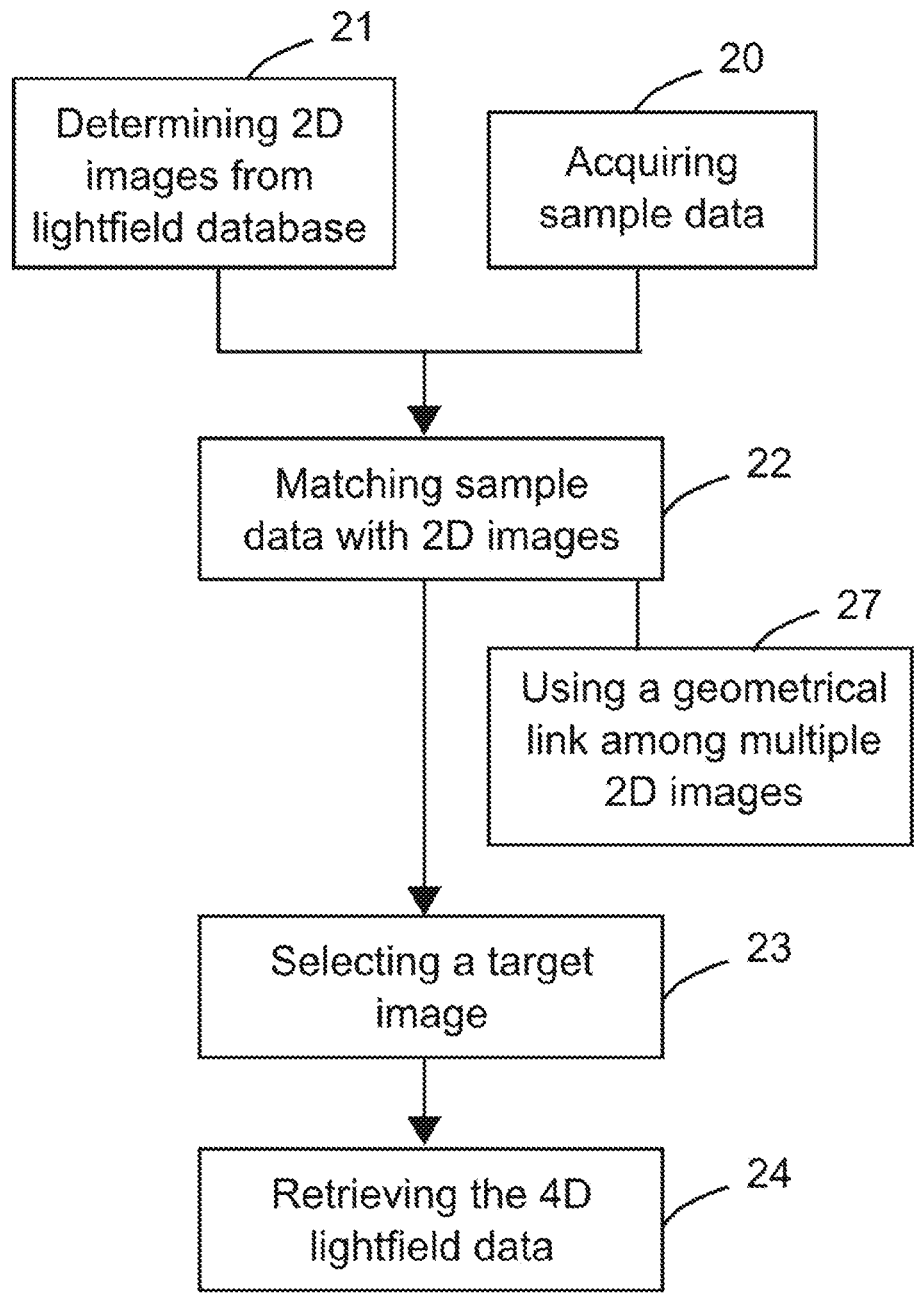
FIG. 4 is a flow chart illustrating yet another preferred embodiment of a method for data retrieval in a lightfield database.

Referring to FIG. 4, in another embodiment, the method further comprises using 27 a geometrical link among multiple 2D images that is determined from a same lightfield data of the lightfield database. The geometrical link represents a relationship among the geometrical parameters of the multiple 2D images. The geometrical link allows preferably to order the multiple 2D images. For example, a geometrical link can organize the multiple 2D images into an ordered list or a grid. A one-dimensional grid or ordered list can be for example a focal stack with focal length being the geometrical parameters, and a two-dimensional grid can be for example a grid of multiple views with different viewing directions where the coordinates of the viewing direction vectors are the geometrical parameters. Before populating the grid, a search strategy determines the respective next 2D image to be compared and matched. By using the geometrical link, it becomes unnecessary to match and review all possible 2D images determined from the lightfield database, and thus accelerate the search and retrieval in the lightfield database.

In one embodiment, a geometric link of focal stack is used 27, which illustrates the focal planes of the multiple 2D images in a sequence according to a distance between the focal plane and the image plane in each of the multiple 2D images.

This embodiment of the proposed method further comprises, for each lightfield data in the lightfield database, matching 22 the sample data with a first and a second 2D image of the multiple 2D images, and calculating a first and second feature distance respectively. The calculated first and second feature distances are then used to determine a matching strategy corresponding to the focal stack. Examples of the matching strategy are provided below. Preferably, the determination of the matching strategy comprises recursively matching the sample data with a subset of the multiple 2D images determined from the each lightfield data of the lightfield database. For example, subsequent to the matching with the first and second 2D images, a third 2D image is chosen to be matched with the sample data, and the matching result contributes to the determination of the matching strategy. In other words, the matching and calculating steps are performed recursively according to the calculated feature distances and the matching strategy, in order to select 23 a candidate 2D image of the multiple 2D images which has a smallest feature distance. Subsequently, based on the matching result and the use of the geometry link, one of the candidate images of the lightfield data is selected as the target image, followed by retrieval 24 of the 4D lightfield data from which the target image is determined.

By exploiting the geometrical link of focal stack, the operation unit 13 can match 22 the sample data with these multiple 2D images from the lightfield database using a systematic retrieval strategy. An example of the matching strategy is provided as following.

As a beginning, the sample data is matched 22 with a $1^{st}$ 2D image having a first index ($I_1$), e.g., corresponding to a focal plane at mean focal distance between focal plane and image plane, in the ordered focal stack, and a resulted first distance ($D_1$) of feature vectors is accordingly calculated. Then the sample data is matched to a second 2D image having a second index ($I_2$) in the ordered focal stack, and a corresponding second distance ($D_2$) of feature vectors is calculated.

If $D_2 < D_1$, $D_2$ is kept in record as the smallest feature distance, and it can be anticipated that the feature distance becomes smaller as the index increases. It is then reasonable to match 22 the sample data with a third image having a third index ($I_3$) that is subsequent to $I_2$ and equals to $I_2$ plus the interval between $I_1$ and $I_2$. The resulted feature distance $D_3$ is then compared to $D_2$ to see which is smaller.

If $D_2 \geq D_1$, the sample data is matched 22 to a third image having a third index ($I_3$) being in between of $I_1$ and $I_2$, and also to a fourth image having a fourth index ($I_4$) smaller than $I_1$. It can be understood that this is for the same purpose to find a smallest resulted feature distance, and accordingly select 23 an optimal 2D image as the target image with the smallest feature distance.

In another embodiment, a geometric link of a combined depth map is used 27. The combined depth map is associated to an all-in-focus image determined from each lightfield data of the lightfield database. An all-in-focus image shows the captured scene well focused, independent from the depths of different objects in the scene.

The combined depth map used here is calculated and generated by combining multiple disparity maps, which are associated to the multiple 2D images determined from a same lightfield data of the lightfield database, into one single combined depth map. Each of the multiple disparity maps is generally calculated from two different out of the multiple 2D images that capture the same scene or the same objects with different viewpoints. Each pixel of the combined depth map indicates the depth of the object visible at the corresponding pixel of the all-in-focus image. Optionally, the disparity map and the combined depth map can also be generated using any other feasible methods and techniques used for light field data, e.g. depth from defocus on the focal stack.

In this embodiment, an all-in-focus 2D image for each 4D lightfield data of the lightfield database is particularly determined 21. Each all-in-focus 2D image shows the captured scene well focused, independent from the depths of different objects in the scene. In addition, a depth map associated to each of the all-in-focus image is also generated.

Accordingly, the proposed method further comprises, for each lightfield data of the lightfield database, matching 22 the sample data with the determined all-in-focus image and determining one geometrical position in the all-in-focus image having a highest similarity with the sample data. This matching might include geometrical operations such change of scale and rotation of the sample data. By using the all-in-focus image, the matching and comparison is efficient and time-saving since there is no out-of-focus blur. The combined depth map associated to the corresponding all-in-focus image is then used 27, specifically to identify the depth of the determined position in the all-in-focus image. For each lightfield data, a candidate 2D image of the multiple 2D images can thus be selected, which is the 2D image having a focal plane with/on the depth of the determined position.

A feature distance between the sample data and the each candidate 2D image of the each lightfield data is then calculated. Subsequently, the candidate 2D image with a smallest feature distance is selected 23 as the target image, followed by retrieving 24 the 4D lightfield data from which the target image is determined.

In this embodiment, the search can be implemented independent of the size of the focal stack, which can thus accelerate the search and retrieval in the lightfield database.

Optionally, the calculation of the feature distances can be performed according to any available or known techniques in the field, for example, the method described in [II].

In yet another embodiment, the matching 22 of the sample data with the 2D images from the lightfield database can be carried out using feature descriptors and/or the method of bag of features.

REFERENCE

[I] R. Ng, et al., "Light field photography with a hand-held plenoptic camera", Standford University Computer Science Tech Report CSTR, April 2005

[II] K. E. A. van de Sande, et al., "Evaluating color descriptors for object and scene recognition", IEEE Transactions on Pattern Analysis and Machine Intelligence, 32 (9), pp. 1582-1596, 2010

What is claimed is:

1. A method for querying a database of 4D Lightfield Data objects, comprising:
   determining to query the database using a search query image;
   generating, for each 4D Lightfield Data object in the database, multiple 2D images which differ from one another in at least one geometrical parameter;
   performing a matching operation between the search query image and the generated 2D images to determine a target image, the target image being the generated 2D image which most closely matches the search query image according to a metric;
   determining a target 4D Lightfield Data object, as the 4D Lightfield Data object from which the target image was generated; and
   retrieving the target 4D Lightfield Data object in response to the query.

2. The method of claim 1, wherein the search query image is determined based on user input.

3. The method of claim 1, wherein the search query image is a representative image generated from a 4D Lightfield Data query object.

4. The method of claim 1, wherein the generated 2D images for a given 4D Lightfield Data object are ordered based on the at least one geometrical parameter, and the matching operation between the search query image and the generated 2D images are performed based on the order.

5. The method of claim 4, wherein the geometrical parameter is focal length and the matching operation between the search query image and the generated 2D images are performed based on a 1D ordering according to focal length.

6. The method of claim 5, wherein the matching operation comprises an iteration on a subset of the plurality of generated 2D images, the iteration being based on feature distances between the search query image and 2D images selected from the plurality of generated 2D images according to focal length.

7. The method of claim 6, wherein the matching operation comprises:
   determining a first feature distance between the search query image and a first generated 2D image selected from the plurality of generated 2D images having a first index in the 1D ordering of the plurality of generated 2D images,
   determining a second feature distance between the search query image and a second generated 2D image selected from the plurality of generated 2D images having a second index in the 1D ordering of the plurality of generated 2D images,
   comparing the first feature distance to the second feature distance; and
   selecting a further first generated 2D image and a further second generated 2D image based on the comparison result, the further first generated 2D image and the further second generated 2D image to be compared in a further search iteration.

8. The method of claim 4, wherein the geometrical parameter is viewing direction and the matching operation between the search query image and the generated 2D images are performed based on a 2D ordering according to a grid of viewing directions.

9. An apparatus for querying a database of 4D Lightfield Data objects, comprising a processing device configured to:
   determine to query the database using a search query image;
   generate, for each 4D Lightfield Data object in the database, multiple 2D images which differ from one another in at least one geometrical parameter;
   perform a matching operation between the search query image and the generated 2D images to determine a target image, the target image being the generated 2D image which most closely matches the search query image according to a metric;
   determine a target 4D Lightfield Data object, as the 4D Lightfield Data object from which the target image was generated; and
   retrieve the target 4D Lightfield Data object in response to the query.

10. The apparatus of claim 9, wherein the search query image is determined based on user input.

11. The apparatus of claim 9, wherein the search query image is a representative image generated from a 4D Lightfield Data query object.

12. The apparatus of claim 9, wherein the generated 2D images for a given 4D Lightfield Data object are ordered based on the at least one geometrical parameter, and the matching operation between the search query image and the generated 2D images are performed based on the order.

13. The apparatus of claim 12, wherein the geometrical parameter is focal length and the matching operation between the search query image and the generated 2D images are performed based on a 1D ordering according to focal length.

14. The apparatus of claim 13, wherein the matching operation comprises an iteration on a subset of the plurality of generated 2D images, the iteration being based on feature distances between the search query image and 2D images selected from the plurality of generated 2D images according to focal length.

15. The apparatus of claim 14, wherein the matching operation comprises:
   determining a first feature distance between the search query image and a first generated 2D image selected from the plurality of generated 2D images having a first index in the 1D ordering of the plurality of generated 2D images,
   determining a second feature distance between the search query image and a second generated 2D image selected from the plurality of generated 2D images having a second index in the 1D ordering of the plurality of generated 2D images,
   comparing the first feature distance to the second feature distance; and
   selecting a further first generated 2D image and a further second generated 2D image based on the comparison result, the further first generated 2D image and the further second generated 2D image to be compared in a further search iteration.

16. The apparatus of claim 12, wherein the geometrical parameter is viewing direction and the matching operation between the search query image and the generated 2D images are performed based on a 2D ordering according to a grid of viewing directions.

17. A non-transitory computer readable storage medium having stored therein instructions for querying a database of 4D Lightfield Data objects, which, when executed by a computer, cause the computer to:
   determine to query the database using a search query image;
   generate, for each 4D Lightfield Data object in the database, multiple 2D images which differ from one another in at least one geometrical parameter;
   perform a matching operation between the search query image and the generated 2D images to determine a target image, the target image being the generated 2D image which most closely matches the search query image according to a metric;
   determine a target 4D Lightfield Data object, as the 4D Lightfield Data object from which the target image was generated; and
   retrieve the target 4D Lightfield Data object in response to the query.

18. The non-transitory computer readable storage medium of claim 17 wherein the generated 2D images for a given 4D Lightfield Data object are ordered based on the at least one geometrical parameter, and the matching operation between the search query image and the generated 2D images are performed based on the order.

19. The non-transitory computer readable storage medium of claim 18, wherein the geometrical parameter is focal length and the matching operation between the search query image and the generated 2D images are performed based on a 1D ordering according to focal length.

20. The non-transitory computer readable storage medium of claim 19, wherein the matching operation comprises an iteration on a subset of the plurality of generated 2D images, the iteration being based on feature distances between the search query image and 2D images selected from the plurality of generated 2D images according to focal length.

* * * * *